March 31, 1959 L. F. MILLER 2,879,564
OSCILLATORY MOLDING MACHINE
Filed July 19, 1955 4 Sheets-Sheet 1

INVENTOR.
LEON F. MILLER
BY
Oberlin & Limbach
ATTORNEYS.

March 31, 1959 L. F. MILLER 2,879,564
OSCILLATORY MOLDING MACHINE
Filed July 19, 1955 4 Sheets-Sheet 4

INVENTOR.
LEON F. MILLER
BY
Oberlin & Limbach
ATTORNEYS.

United States Patent Office 2,879,564
Patented Mar. 31, 1959

2,879,564
OSCILLATORY MOLDING MACHINE

Leon F. Miller, Rocky River, Ohio, assignor to The Osborn Manufacturing Company, Cleveland, Ohio, a corporation of Ohio Application July 19, 1955, Serial No. 522,929

16 Claims. (Cl. 22—21)

This invention relates as indicated to an oscillatory molding machine, and more particularly to a multiple station molding machine in which the work is swung back and forth between respective stations.

Rotary molding machines have been proposed in the past by means of which the work is to be successively transferred from station to station with a different operation such as filling, squeezing and drawing being performed at each station. While early efforts in this direction were not commercially successful, machines of the type disclosed in my co-pending application Serial No. 272,969 filed February 23, 1952, now Patent No. 2,783,-509, issued March 5, 1957, have met with very considerable commercial success and have now been rather widely adopted by the automotive industry. Such rotary machine of my invention has succeeded in greatly increasing the production of large molds and cores, with improvement in the uniformity of the product and a very substantial reduction in the personnel required. Rotary machines nevertheless involve various operational problems. A variety of fluid pressure piston-cylinder assemblies are utilized to perform many different functions in such machines, and it is something of a problem to provide satisfactory connections with the fluid pressure sources, rotating seals frequently being required. Furthermore, intermittent rotation of the turret or turntable by means of a Geneva movement involves a certain amount of lost motion while the Geneva mechanism returns to starting position preliminarily to initiating further rotation of the turntable in the same direction. Such lost motion may not only require an increased time interval but in any event involves a waste of compressed air utilized to drive the Geneva piston-cylinder assembly. It has also been necessary to provide special stop means for the turntable which obviously cannot be quite as positive and exact as fixed stop means would be in registering the turntable or equivalent when the latter is indexed to each station. And finally, while greatly increased production has been achieved by employment of my aforesaid rotary molding machine, nevertheless there is increasing demand for a machine of still greater productivity.

It is accordingly a principal object of my invention to provide a multiple station molding machine which will produce completed foundry molds at a rapid rate and without any substantial lost motion in its operation.

Another object is to provide such machine which will be balanced in operation and adapted to produce both cope and drag molds at the same time.

A further object is to provide such machine which will be oscillatory rather than truly rotary in its action and accordingly will permit the employment of fixed stops at the respective stations and flexible supply lines from fluid pressure sources without need for rotary seals.

Still another object is to provide a machine which may be continued in partial operation even when one mold producing assembly thereof is under repair.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Referring now more particularly to said drawing, the preferred embodiment of my invention there illustrated comprises a central box frame base 1 having a vertical tubular column 2 centrally supported therein. At opposite sides of such central box frame 1 and rigidly secured thereto are identical jolt-squeeze cylinders 3 and 4 having pistons 5 and 6 therein carrying work supporting tables 7 and 8 respectively.

Figure 3:
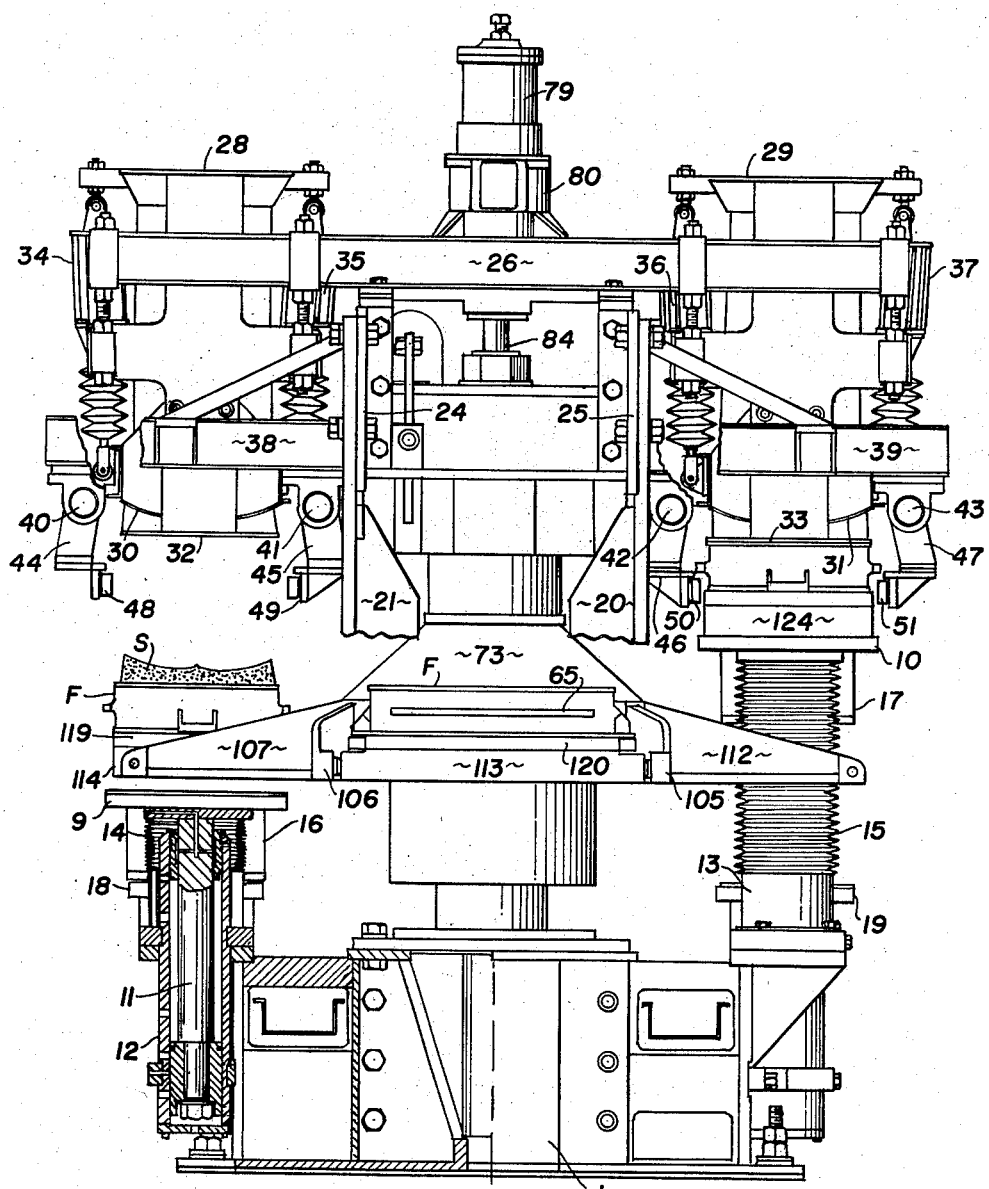
Fig. 3 is a vertical elevation of such machine with a portion of the base frame broken away better to disclose certain of the internal structure.

Also arranged diametrically of central column 2 and positioned midway between jolt tables 7 and 8 circumferentially of such column are a pair of lift tables 9 and 10 (Fig. 3) supported on pistons such as 11 within vertical cylinders 12 and 13 whereby such tables may be raised and lowered as desired. Extension boots such as 14 and 15 may be provided to protect the mechanisms from sand. Such tables may be provided with rest blocks 16 and 17 adapted to support the tables on rests 18 and 19 when lowered.

Figure 1:
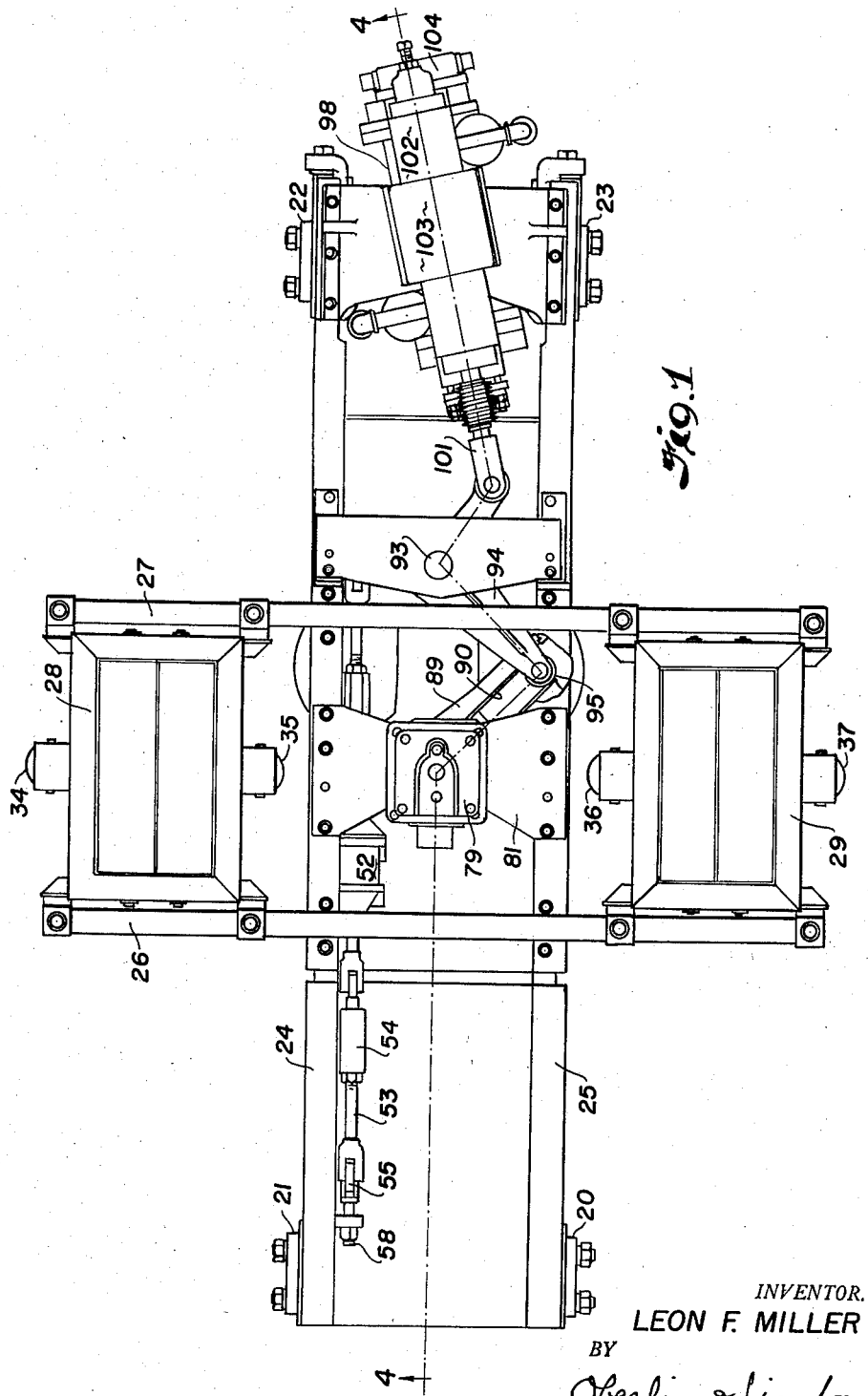
Fig. 1 is a top plan view of a preferred embodiment of my new machine.
Figure 2:
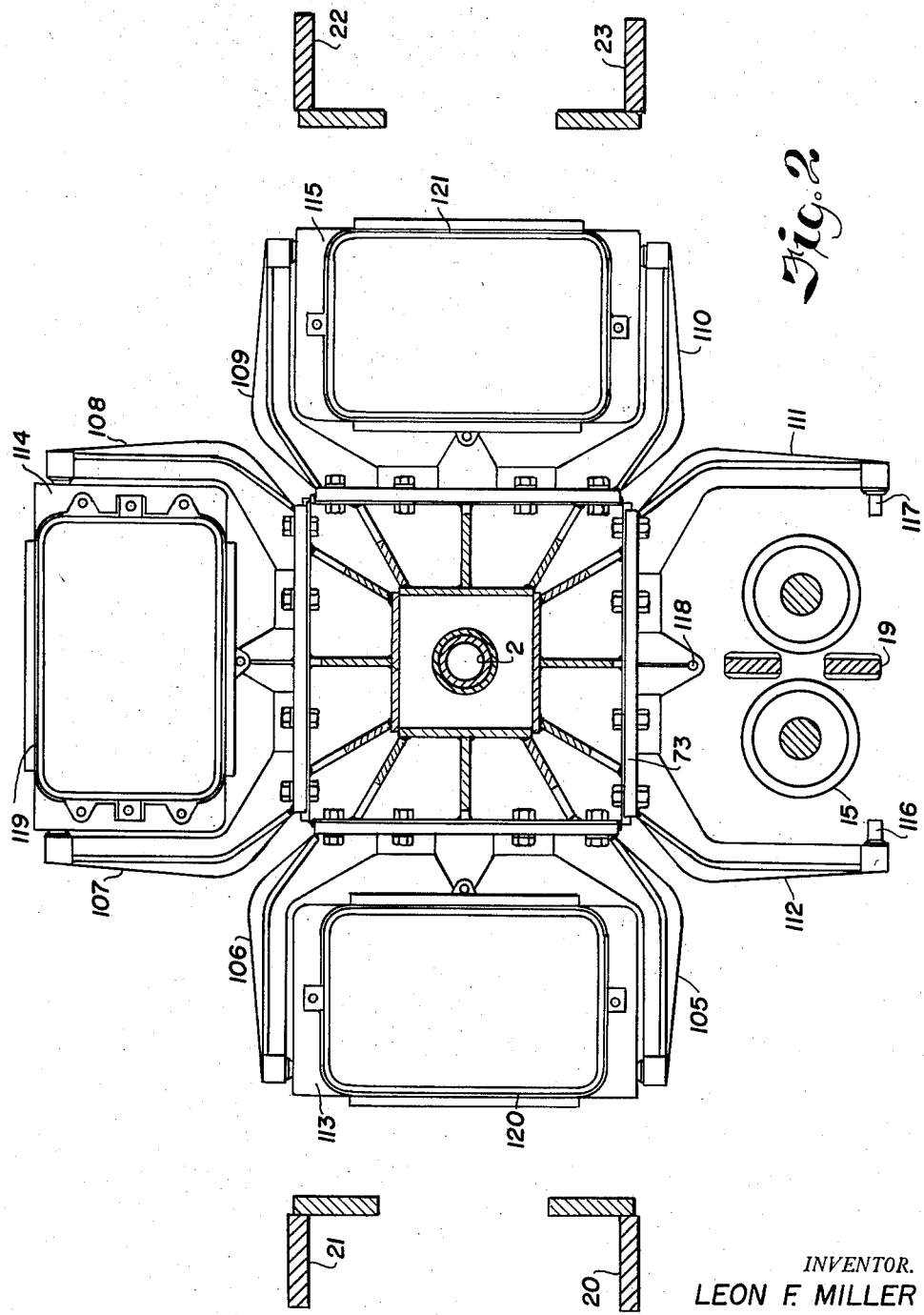
Fig. 2 is a horizontal section through the turret of such machine showing the platen transporting arms on said turret.

Four posts 20, 21, 22 and 23 bolted to the base frames supporting jolt-squeeze cylinders 3 and 4 carry a stationary head frame comprising principally horizontal beams 24 and 25. Supported on such beams transversely thereof is another pair of beams 26 and 27 (Fig. 1). Sand hoppers 28 and 29 are supported adjacent the ends of such latter cross-beams and provided with the usual hopper gates such as 30 and 31 and depending skirts 32 and 33. Hopper gate cylinders 34, 35, 36 and 37 are operative to open and close such gates in the usual manner.

Also carried by beams 24 and 25 beneath beams 26 and 27 are laterally projecting brackets such as 38 and 39 carrying pairs of parallel horizontal shafts 40, 41, 42 and 43 on which depending hangers such as 44, 45, 46 and 47 are mounted. These hangers carry rollers such as 48, 49, 50 and 51 adapted to engage appropriate rails on the sides of mold flasks to support the latter when the hangers are swung in toward each other on their supporting shafts. When they are swung outwardly away from each other, they will then clear the flasks to permit vertical reciprocation of the same.

Figure 4:
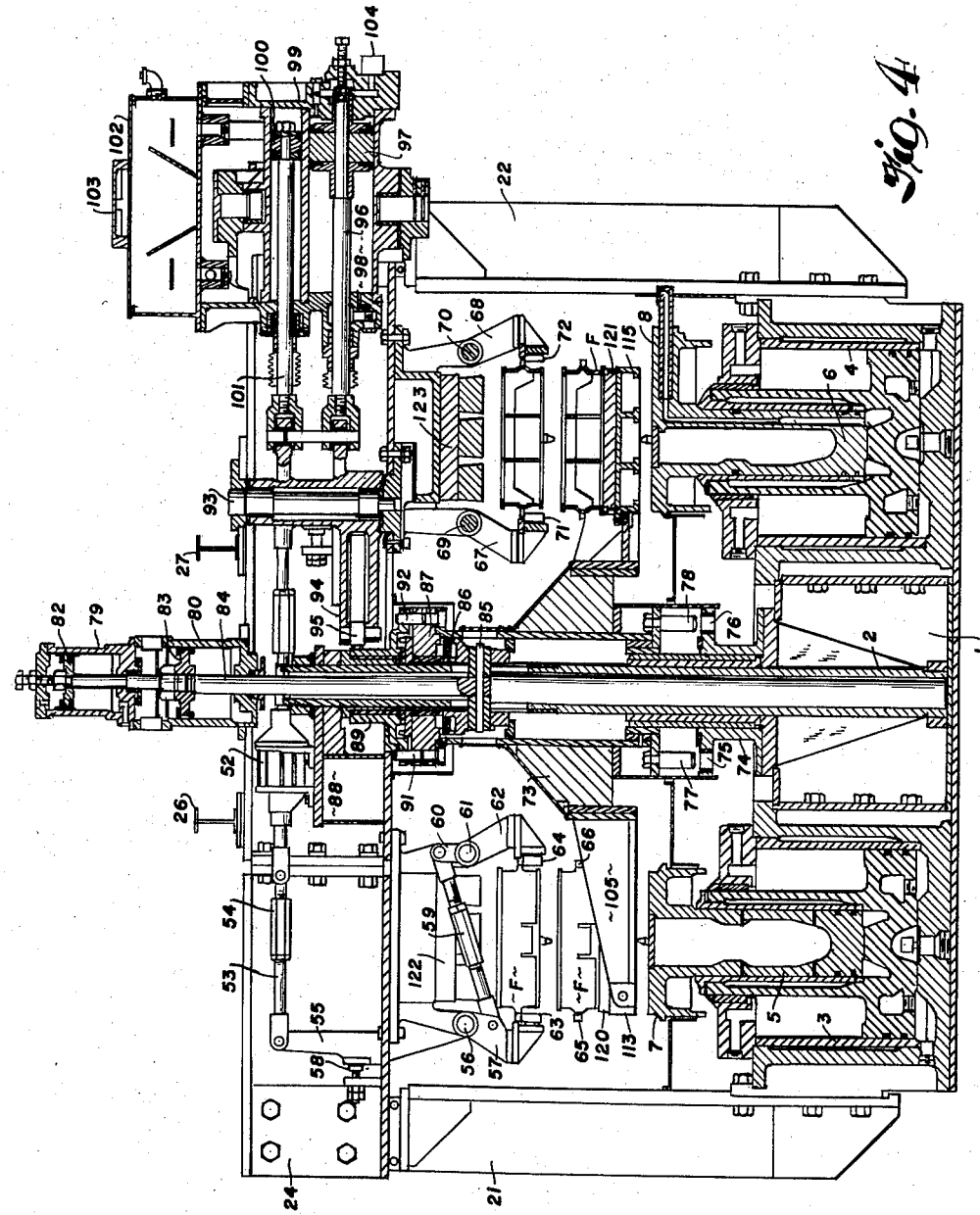
Fig. 4 is a vertical section taken on the line 4—4 on Fig. 1.

The mechanism by which such hangers may thus be simultaneously swung in and out, toward and away from each other, is best illustrated in Fig. 4 showing similar flask supporting means at the squeeze and draw stations. A piston-cylinder assembly 52 is mounted in the head frame in a horizontal position with a piston rod 53 extending therefrom provided with a turn buckle adjustment 54 and pivotally connected to lever 55 keyed to shaft 56 as is hanger 57. An adjustable stop 58 limits the degree to which such lever may be rocked outwardly and accordingly to the degree to which such hanger may be rocked inwardly. A turn buckle connection 59 pivotally connects hanger 57 and lever arm 60 keyed to shaft 61, as is hanger 62. It will accordingly be seen that when hanger 57 is rocked inwardly to the position shown in Fig. 4 through energization of piston-cylinder assembly 52, hanger 62 will likewise be swung inwardly to a similar degree and rollers 63 and 64 will be enabled to support the side rails 65 and 66 on flask F.

Of course, at the diametrically opposite station, hangers 67 and 68 keyed to shafts 69 and 70 and carrying rollers 71 and 72 are adapted to be similarly operated. Flasks are shown supported on such rollers subsequent to performance of the squeezing and drawing operations and ready to be rolled out of the machine onto adjacent conveyors (not shown). Other flasks are shown on the turntable therebelow ready for the jolt-squeeze operation. The empty flasks will of course be rolled onto the rollers at the two fill stations (Fig. 3) when entering the machine and will be rolled out of the machine from the similar rollers adapted to support the same at the molding stations (Fig. 4).

A turntable or turret is provided adapted to be oscillated back and forth to transfer the filled flasks from the filling stations to the molding stations. Such turret comprises a main annular four-sided frame 73 encircling central column 2 and centered thereon by appropriate bearings permitting vertical reciprocation, the turret being shown in elevated or indexing position in Figs. 3 and 4. A bumper ring 74 supports the turret when the latter is lowered after indexing, and such ring is provided with four apertures in its upper surface such as 75 and 76 corresponding to the four stations of the machine into which registering pins 77 and 78 are adapted to fit when the turret is lowered. Ring 74 is, of course, rigid with the main central box frame 1 and serves to lock the turret against rotation.

Vertically aligned fluid pressure cylinders 79 and 80 are mounted on plate 81 bridging beams 24 and 25 directly above tubular column 2. Pistons 82 and 83 in such respective cylinders are secured to rod 84 which extends downwardly into column 2, a cross-member 85 fixed to the lower end of such rod protruding laterally through corresponding slots in the column. Such cross-member supports a bearing 86 which in turn carries the upper head or indexing pin plate 87 of the turret, turret 73 being suspended therefrom. As will be apparent from the foregoing, rod 84 may be reciprocated to lift turret 73 to disengage pins 77 and 78 from ring 74 so that the turret may thereupon be rotated on its bearings 86 in a manner explained below.

Cylinder 79 is the actual lift cylinder, cylinder 80 being a counterbalancing cylinder effective more particularly to cushion the descent of the heavy turret after indexing, an accumulator 88 being provided to receive the fluid flow from cylinder 80 below piston 83 and such flow being regulated by passage through a constricted orifice or flow control valve.

In order to oscillate turret 73, an indexing arm 89 having a cam track 90 therealong is mounted for oscillation about the upper portion of central column 2. Upstanding pins 91 and 92 (Fig. 4) on upper turret head or pin plate 87 are adapted to engage in corresponding apertures in the lower radial flange of arm 89 when the turret has been elevated. It will accordingly be seen that when the turret is lowered, it is locked in position against rotation through the agency of downwardly extending pins 77 and 78, but when such turret is elevated these pins are disengaged and pins 91 and 92 are instead engaged with indexing arm 89.

Mounted for oscillation on vertical post 93 is an indexing lever or crank 94 carrying a cam roller 95 at its end adapted to roll along trackway 90 in indexing arm 89. Lever 94 is in turn oscillated by means of piston rod 96 pivotally connected thereto and adapted to be reciprocated by actuation of piston 97 in cylinder 98. A cushion cylinder 99 thereabove is provided with a piston 100 and rod 101 likewise pivotally connected to lever 94. Such cushioning cylinder is provided with a reservoir 102 thereabove having a breather 103, fluid being forced from the respective ends of such cushion cylinder into such reservoir as piston 100 is reciprocated under the influence of fluid pressure admitted to cylinder 98 through indexing valve 104. Each stroke of piston 97 is effective to swing turret indexing arm 89 and accordingly the turret 73 through an arc of 90°, first in one direction and then in the other.

The turret is itself provided with arms or cradles 105, 106, 107, 108, 109, 110, 111 and 112 which extend generally horizontally outwardly therefrom in pairs to carry work supporting platens such as 113, 114 and 115 which may be generally similar to those disclosed in my above said Patent 2,783,509. In the embodiment illustrated herein, however, I provide opposed trunnions such as 116 and 117 projecting horizontally toward each other and adapted to fit in corresponding half trunnion bearings in the undersides of the platens adjacent the outer edges of the latter. The radially inner edges of the platens (having regard to the turret) are supported on vertically adjustable buttons such as 118 whereby the platen may be leveled. It will accordingly be seen that the undersides of the platens are exposed at the several stations, permitting engagement and lifting of the platens by mechanisms such as jolt tables 7 and 8 and lift tables 9 and 10. The trunnion supports with their beveled inner ends ensure proper exact registration of the platens when the latter are again deposited upon the supporting arms. Cope pattern member 119 may be mounted on platen 114 adjacent drag pattern 120 mounted on platen 113 and adapted to form the mating part of the same finished mold. Similarly, cope pattern 121 may be mounted on platen 115 and a drag pattern (not shown) to produce a mold half complementary thereto may be carried by the platen on turntable arms 111 and 112. Of course, the two sets of patterns in the machine may be identical and the machine will then produce identical copes and drags with each operation. It will often be preferred, however, that the patterns be selected to produce two different molds when the resultant mold halves are brought together. In any event the respective cope and drag patterns will ordinarily be located in the machine as indicated above with the two drag patterns adjacent and the two cope patterns adjacent.

Squeeze heads 122 and 123 are provided at the respective jolt-squeeze stations (Fig. 4) adapted to compact the sand in the flasks when jolt tables 7 and 8 are elevated for this purpose.

The operation of my new machine may now readily be understood. Empty flasks F may be simultaneously introduced at each of the fill stations resting on the rollers on swinging hangers 44, 45 and 46, 47, and slightly spaced below the skirts 32 and 33 of the respective hoppers. The lift tables such as 10 in Fig. 3 will then be simultaneously elevated by energization of their subjacent piston-cylinder assemblies to lift the side rails of the flasks from their supporting rollers and to press the upper rims of the flasks against the hopper skirts. The hopper gates are opened and then closed, filling the flasks to excess with sand S. While this is taking place, the roller supporting hangers are swung away from each other and accordingly when the lift tables 9 and 10 are next lowered, the flasks do not again engage the rollers but instead descend until platens 114 and 124 rest upon the corresponding turntable arms in the manner illustrated at the left in Fig. 3. During the filling operation, the turret is elevated to receive the platens on its arms or cradles as the pistons drop the lift tables 9 and 10 to their lowermost positions.

When hydraulic fluid is admitted to the lower end of lift cylinder 79 to reciprocate piston 82 and rod 84 to lift the turntable or turret 73, downwardly projecting locking pins 77 and 78 are disengaged from the fixed bumper ring 74 and upstanding pins 91 and 92 are caused to engage in corresponding apertures in the radial bottom flange of indexing arm 89. Hydraulic fluid is then admitted to the right-hand end of cylinder 98 (as viewed in Fig. 4) to extend rod 96 and rock indexing lever 94 to swing arm 89 and consequently turret 73 through a 90° arc about the axis of column 2 and rod 84. When the two newly filled flasks have been thus swung into position above jolt tables 7 and 8 (Fig. 4), fluid is exhausted from the lower end of lift cylinder 79 and the turret permitted to descend to disengage pins 91 and 92 and re-engage locking pins 77 and 78. Such downward movement of the turntable and turntable arms is, moreover, sufficient to deposit the platens, patterns and flasks upon such jolt tables 7 and 8 and the jolt cylinders may thereupon be actuated to jolt the flasks and compact the sand therein. Hangers 57, 62, 67 and 68 are swung apart and the respective jolt tables now elevated to lift the flasks and squeeze the molds against the respective squeeze heads 122 and 123. While this is taking place, the pairs of hangers are swung toward each other to bring their rollers into position to engage the undersides of the side rails on the flasks when the latter are again lowered. Upon completion of the squeezing operation, the jolt tables are lowered to original positions, first depositing the flasks containing the jolted and squeezed molds upon the rollers and then continuing downwardly to draw the patterns from the molds. Finally, the platens and patterns mounted thereon are redeposited upon the turntable arms and the tables dropped sufficiently to clear the same. The completed molds may now be rolled out of the machine manually or by appropriate pusher mechanism onto adjacent conveyors (not shown).

While I have described the passage of a pair of flasks through my new machine, it will be understood that a preceding pair of flasks containing molds were being jolted and squeezed during performance of the filling operation described and a succeeding pair of flasks were being filled simultaneously with performance of the jolt-squeeze operation described. All four stations of the machine are therefore in operation simultaneously, and each indexing oscillation of the turret carries two filled flasks to the jolt-squeeze stations. There is no lost motion. Since the turret is oscillated through 90°, it will be apparent that a cope and a drag may be produced alternately on each side of the machine and this will be the usual mode of operation although, of course, if desired, the machine might be set up to produce only copes or only drags. While the machine may be controlled by an operator at a manual control panel, it will, of course, be preferred to employ timer actuated control means whereby each step of the cycle may be nicely regulated to the minimum feasible period of time and uniformity of production assured. I am able to produce 500 mold sections per hour on my new machine. In effect, each fill station has two associated jolt-squeeze stations to which the filled flasks are alternately transferred. Should any repair or alteration be required at one of the filling or molding stations, it will often be feasible to continue operations at the other two stations so that production is not entirely halted.

Other modes of applying the principle of the invention may be employed, change being made as regards the details described, provided the features stated in any of the following claims or the equivalent of such be employed.

I therefore particularly point out and distinctly claim as my invention:

1. A four station molding machine comprising a central turret mounted for oscillation about a vertical axis, four sets of horizontally outwardly projecting platen supports on said turret disposed 90 degrees apart circumferentially of said turret, a pair of diametrically opposite flask filling stations including sand hoppers positioned above said platen supports, a pair of diametrically opposite mold squeeze stations disposed at positions 90 degrees from said filling stations circumferentially of said turret, squeeze heads at said squeeze stations, and turret oscillating mechanism operative to oscillate said turret 90 degrees about its axis to bring each said set of platen supports from one station to an adjacent station, whereby at each dwell two flasks may be filled and two molds squeezed and at each oscillatory movement of said current two filled flasks may be transported to the two squeeze stations.

2. The machine of claim 1, wherein vertical piston-cylinder means are provided at each station operative to lift a flask-bearing platen to present such flasks to said hoppers at said fill stations and to squeeze the sand in such flasks against said squeeze heads at said molding stations.

3. The mechanism of claim 1, including means operative to reciprocate said turret vertically, and means operative to lock said turret against oscillation in its lowered position only.

4. The mechanism of claim 1, including means operative to reciprocate said turret vertically, means operative to lock said turret against oscillation in its lowered position only, and connecting means for interconnecting said turret and oscillating mechanism operative when said turret is in elevated position only.

5. The mechanism of claim 1, including roller supports for such flasks disposed at each station beneath said hoppers at said fill stations and beneath said squeeze heads at the squeeze stations, whereby flasks may be rolled into said machine at said fill stations and rolled out of said machine at said squeeze stations, and means operative to shift said roller supports out of flask engaging position.

6. The mechanism of claim 1, including roller supports for such flasks disposed at each station beneath said hoppers at said fill stations and beneath said squeeze heads at the squeeze stations, whereby flasks may be rolled into said machine at said fill stations and rolled out of said machine at said squeeze stations, means operative to shift said roller supports out of flask engaging position, and vertically disposed lift means at each said station operative to lift flasks from said roller supports at said fill stations to present such flasks to said hoppers for filling and to lift flasks from said roller supports on said turret at said squeeze stations, press such flasks against said squeeze heads at said squeeze stations, and deposit the flasks containing squeezed molds upon said roller supports as said lift means are subsequently lowered.

7. A four station molding machine comprising a central turret mounted for oscillation about a vertical axis, means on said turret for supporting four flasks thereon disposed 90 degrees apart circumferentially of said turret, a pair of diametrically opposite flask filling stations including sand hoppers positioned above said turret flask supporting means to deliver sand into such flasks, a pair of diametrically opposite mold squeeze stations disposed at positions 90 degrees from said sand filling stations circumferentially of said turret, squeeze heads at said squeeze stations, turret oscillating mechanism operative to oscillate said turret back and forth 90 degrees about its axis to bring each said flask supporting means on said turret from one station to an adjacent station and back again, whereby at each dwell two flasks may be filled and two molds squeezed and at each oscillatory movement of said turret two filled flasks may be transported to the two squeeze stations, anti-friction supports for such flasks disposed at each station beneath said hoppers at said fill stations and beneath said squeeze heads at said squeeze stations, whereby flasks may be moved horizontally into said machine at said fill stations and out of said machine at said squeeze stations, means operative to shift said anti-friction supports out of flask engaging position, and lift means at each said station operative to lift flasks from said anti-friction supports at said fill stations to present such flasks to said hoppers for filling, whereupon said anti-friction supports may be shifted out of flask engaging position to permit lowering of the filled flasks for deposit upon said flask supporting means on said turret for subsequent oscillatory transfer, and to lift filled flasks from said turret at said squeeze stations, press such flasks against said squeeze heads to squeeze the molds therein, deposit such flasks containing the squeezed molds upon said associated anti-friction supports as said lift means are subsequently lowered, and to continue their downward movement to draw patterns from such molds.

8. The machine of claim 7, including means operative to reciprocate said turret vertically, and means operative to lock said turret against oscillation in its lowered position only.

9. The machine of claim 7, including means operative to reciprocate said turret vertically, means operative to lock said turret against oscillation in its lowered position only, and connecting means for interconnecting said turret and oscillating mechanism operative when said turret is in elevated position only.

10. The machine of claim 7, wherein said flask supporting means on said turret comprise spaced horizontally projecting arms having aligned trunnions adjacent their outer ends projecting toward each other, and vertically adjustable supporting members disposed radially inwardly thereof.

11. The machine of claim 7, wherein said flask supporting means on said turret comprise individual platens having aligned half trunnion bearings in the underside of their end portions adjacent the outer edges thereof, pattern boards on said platens, spaced horizontally projecting arms having aligned trunnions adjacent their outer ends projecting toward each other and adapted to fit in said half bearings, and vertically adjustable support elements on said turret positioned to engage and support the undersides of said platens adjacent their inner edges, whereby said platens may be rocked on said bearings to level the same.

12. A four station molding machine comprising a central turret mounted for oscillation about a vertical axis, means on said turret for supporting four flasks thereon disposed 90 degrees apart circumferentially of said turret, a pair of diametrically opposite flask filling stations including sand hoppers positioned above said turret flask supporting means to deliver sand into such flasks, a pair of diametrically opposite mold squeeze stations disposed at positions 90 degrees from said sand filling stations circumferentially of said turret, squeeze heads at said squeeze stations, vertically disposed piston-cylinder means operative to lift and suspend said turret for oscillation, means operative to lock said turret against oscillation when in lowered position, turret oscillating mechanism operative to oscillate said turret back and forth 90 degrees about its axis to bring each said flask supporting means on said turret from one station to an adjacent station and back again, whereby at each dwell two flasks may be filled and two molds squeezed and at each oscillatory movement of said turret two filled flasks may be transported to the two squeeze stations, said oscillating mechanism comprising a ring coaxial with said turret, means on said ring adapted to interengage with said turret for oscillation therewith when said turret is elevated only, piston-cylinder means operative to oscillate said ring, anti-friction supports for such flasks disposed below said hoppers at said fill stations whereby flasks may be moved horizontally into said machine at said fill stations, said flask supporting means on said turret comprising individual platens having aligned half trunnion bearings in the underside of their end portions adjacent the outer edges thereof, pattern boards on said platens, spaced horizontally projecting arms on said turret having aligned trunnions adjacent their outer ends projecting toward each other and adapted to fit in said half bearings, vertically adjustable support elements on said turret positioned to engage and support the undersides of said platens adjacent their inner edges, whereby said platens may be rocked on said bearings to level the same, lift means at said fill stations operative to lift platens from said supports on said turret to engage the undersides of flasks on said anti-friction supports to lift them therefrom and present them to said respective hoppers for filling, means operative to shift said anti-friction supports out of flask engaging position to permit said lift means to descend with the filled flasks to deposit the platens carrying such flasks on said platen supporting means on said turret, anti-friction supports for such flasks disposed below said squeeze heads whereby flasks containing finished mold sections may be moved horizontally out of said machine at said squeeze stations, and lift means at said squeeze stations operative to lift platens carrying filled flasks from said turret to squeeze the sand therein against said squeeze heads, means operative to hold said anti-friction supports at said squeeze stations out of flask engaging position during such lifting operation and thereafter to move said anti-friction supports into flask engaging position, said lift means thereupon being operative to descend to deposit said flasks containing the squeezed mold sections upon said associated anti-friction supports and then to continue their downward movement to draw the patterns from such mold sections.

13. A four station molding machine comprising oscillating flask supporting means mounted for oscillation about a central vertical axis and adapted to support four flasks disposed 90 degrees apart circumferentially of the central vertical axis of said supporting means, two opposite flask filling stations diametrically of such axis, two opposite molding stations diametrically of such axis and disposed at positions 90 degrees from said filling stations circumferentially of said oscillating flask supporting means, and power means operative to oscillate said flask supporting means 90 degrees back and forth about its vertical axis to bring each filled flask from one station to an adjacent molding station, whereby at each dwell two flasks may be filled and two molds formed and at each oscillatory movement of said flask supporting means two filled flasks may be transported to the two molding stations.

14. A multiple station molding machine comprising flask supporting means mounted for oscillation about a vertical axis, at least four work stations disposed uniformly circumferentially of such axis and comprising alternately flask filling stations and mold forming stations, and power means operative to oscillate said flask supporting means back and forth about its axis to bring each filled flask from one station to an adjacent molding station.

15. The mechanism of claim 14, wherein said flask supporting means is mounted for vertical reciprocation into and out of driven relationship to said oscillating means.

16. The mechanism of claim 14, wherein said flask supporting means includes horizontally outwardly projecting spaced arms having aligned trunnions near the outer ends of adjacent arms projecting toward each other, platens having half trunnion bearings in their undersides adapted to rest on pairs of said opposed aligned trunnions, and means on said flask supporting means adapted to support the inner edge portions of said platens.

References Cited in the file of this patent
UNITED STATES PATENTS

| | | |
|---|---|---|
| 1,470,402 | Stoney et al. | Oct. 9, 1923 |
| 1,556,980 | Vial | Oct. 13, 1925 |
| 1,570,658 | Wickland et al. | Jan. 26, 1926 |
| 2,058,762 | Bible | Oct. 27, 1936 |
| 2,438,218 | Johnston | May 23, 1948 |

OTHER REFERENCES

Foundry, October 1953, pages 238–241.